United States Patent Office 3,295,450
Patented Jan. 3, 1967

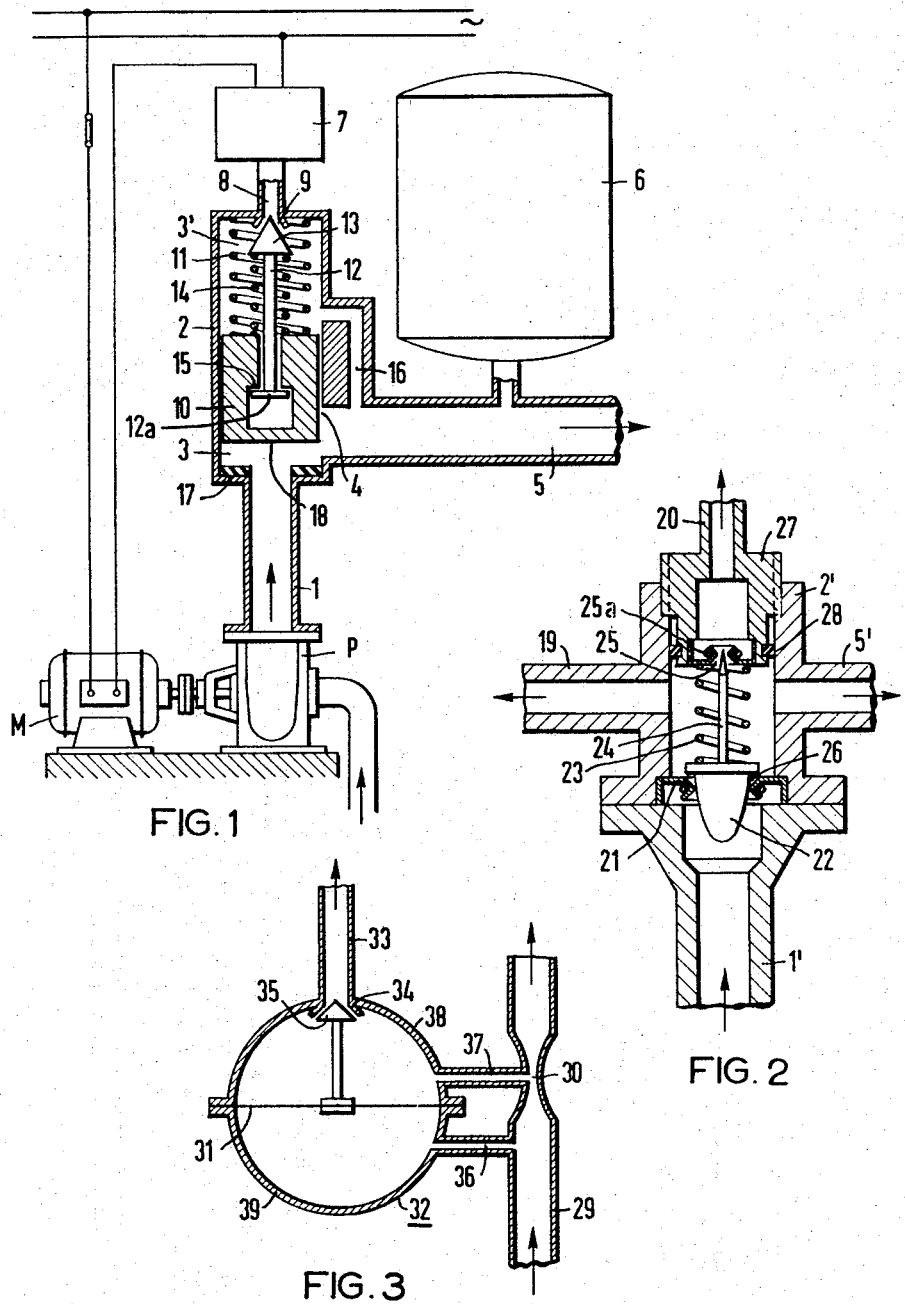

3,295,450
CONTROL DEVICE FOR INDIVIDUAL WATER-PUMP INSTALLATIONS
Siegfried Schönwald and Gert Hecht, Bad Neustadt (Saale), Germany, assignors to Siemens-Schuckertwerke Aktiengesellschaft, Erlangen, Germany, a corporation of Germany
Filed June 26, 1964, Ser. No. 378,242
Claims priority, application Germany, June 28, 1963, S 85,885
5 Claims. (Cl. 103—25)

Our invention relates to electrically-driven water-pumps in systems for supplying water individually or privately to homes, farms, weekend cottages and other consumer units from a well or an available body of surface water, and which are not connected to a larger water-supplying public utility system.

Switching the pumps of such an individual pump installation into and out of operation whenever water is withdrawn, requires rather intricate and troublesome equipment because each of the faucets of water outlet valves connected to the water supply must be provided with an electric control switch to be actuated simultaneously with the faucet or other valve. Such automatic private water-pump installations have therefore been equipped with an elevated storage tank or pressure tank. The pump feeds water into the tank from which the water passes to the individual tap locations. If an elevated tank is provided, the pump is switched on and off in dependence upon the water level in the tank. If a pressure tank is used, the pump is controlled in dependence upon the pressure of the air space enclosed in the tank about the water level. Since the amount of equipment and space required for such automatic pumping plants is rather large, attempts have been made to reduce the size of the pressure tanks as much as possible.

If a small pressure tank has a volume of no more than a few liters or gallons, virtually with each withdrawal of water the pressure in the tank drops down to an amount at which the pump is switched on so that the pump operates each time water is withdrawn. When the water withdrawal is terminated, the pump continues to feed water into the small pressure tank so that the pressure in the tank rises to a value at which the pump is switched off by a pressure responsive switch. With pressure tanks of small volume, this type of operation has the disadvantage that when small quantities of water are withdrawn frequently, the pump is switched on and off continually and consequently operates in short cycles. Pressure in the water lines varies accordingly and the pressure switch for controlling the pump is subjected to considerable wear. Repeated starting of the pump motor also imposes deleterious current surges upon the electric supply line.

To minimize these shortcomings, a regulating device has been proposed which, by means of a spring or diaphragm-controlled pressure reduction valve throttles the pressure in the water disrtibution lines down to an approximately constant value that is below the maximal pressure of the pump. This prevents the occurrence of pressure fluctuations over a large range of water consumption. The pressure reduction valve is closed only at very small flow rates, however, a notch or other constriction having a small cross section is then left open to permit the pressure tank to be filled by a pump until the pressure in the tank increases sufficiently to produce the control pulse for deenergizing the pump. Although this minimizes the above-mentioned disadvantages, the fact that the available pumping pressure is throttled to a smaller value appreciably reduces the efficiency of the installation. Consequently, for attaining a given water pressure required or desired in accordance with the number and type of taps involved, larger pumps for a higher rated pressure and having a correspondingly higher electric power consumption must be used than would be necessary if the full pumping pressure were available to the water system.

It is an object of the invention, therefore, to devise an individual water-pump plant which is capable of operating without the heretofore customary large pressure tanks but which avoids the pendulous or short-cycling operation occurring with small pressure tanks as well as the detrimental throttling losses involved with the above-mentioned known regulating devices.

To this end, and in accordance with the invention, we provide between the pump and the network of water lines, a control device for individual water-pumping plants that is electrically connected with the pump for switching it on independently of the pressure present in the water line system, while switching the pump off in dependence upon the quantity or speed of the water flowing through the system of pipe-lines; that is, the pump-disconnecting operation of the control device is dependent upon an adjusted slight flow rate of water below a rated normal amount of withdrawal.

According to more specific features of the invention, the control device is connected or provided with a pressure-responsive switch for electrically controlling the pump and also comprises a control member responsive to the quantity or velocity of the water passing through the device for controlling the pressure switch in response to the flow rate.

According to another, more specific feature of the invention, the control member responsive to the flow rate comprises a valve slider or similar displaceable component which closes the water line leading to the pressure switch and which opens this line only when the water withdrawal is below the above-mentioned, very small flow rate.

According to another alternative feature, the control member may also be connected with an additional electric switch connected in parallel to the electrical component of the pressure switch. In this case, the pressure switch is preferably connected directly with the electric power supply so that it ordinarily would interrupt the electric supply of current to the pump motor when the switch-off pressure is reached if it were not for the presence of the parallel connected second switch which operates in dependence upon the flow rate and at that moment is still in closed condition. Only when the given very low limit flow rate is reached, can the control member, such as a flow-responsive flap structure, actuate the second electric switch and thus discontinue the supply of electric current to the pump motor.

A control device which according to the invention is equipped with a pump control member responsive to the flow rate, affords withdrawal of any desired water quantity including rather small quantities from the water lines of the installation without causing the pump to be switched on and off continually. The pump operates rather until the tap or taps are closed or the withdrawal of water is reduced below a very slight limit quantity. This limit quantity is predeterminable and is rated at such a small value that it is exceeded by each normal withdrawal of water even if the withdrawal quantity is rather small. Only in the event a defective faucet drips or a faucet is not completely closed inadvertently, will the water withdrawal drop below the limit quantity so that the pump is stopped, and consequently prevents further loss of water due to the inadvertent improper closing or leakage of the tap.

The foregoing as well as further objects, advantages and features of my invention, said features being set forth with particularity in the claims annexed hereto, will be apparent from the following description when taken in conjunction with embodiments of the invention illustrated by way of example in the accompanying drawings in which:

FIG. 1 shows schematically and in section a house water supply unit equipped with a control device according to the invention.

FIG. 2 is a longitudinal section of a somewhat modified control device for such a unit.

FIG. 3 shows schematically and in section another embodiment of a control device applicable in a water supply unit.

The same reference characters are used in different figures for respectively corresponding components.

Figure 4:
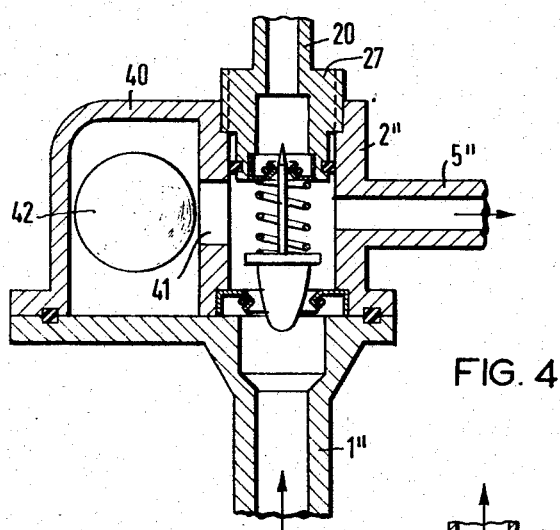
FIG. 4 shows a control device according to FIG. 2 joined with a pressure tank for water storage.

Referring now to the drawings and particularly to FIG. 1, there is shown a pump P driven from an electric motor M so as to draw water from a well and deliver it to a water inlet or main pressure pipe 1 leading to a housing 2 which has a cylindrical inner chamber 3 communicating through a lateral opening 4 with a main pipe 5 of a water distribution or supply system. The flow of water from the well through the pipes 1 and 5 is indicated by the arrows. A pressure storage tank 6 is connected at its bottom with the water main 5. The supply of electric current from a utility line to the motor M is controlled by a pressure responsive switch 7 of conventional construction which is connected by a pressure pipe 8 with the interior 3 of the housing 2, forming a conical valve seat 9 at the junction location. Mounted in the housing 2 is an axially displaceable piston 10 biased by a helical pressure spring 11. Axially displaceable within a central chamber formed in the piston head 10 is a rod 12 carrying a conical valve member 13 at its upper end cooperating with the valve seat 9. The valve rod 12 is biased by a helical pressure spring 14 coaxially seated on the rod and resting with one end against the conical valve member 13 and with the other end against the top of the piston head 10. The rod 12 is thereby urged in the upward direction, the upward motion thereof being limited by a transverse stop member 12a located at the lower end of the rod 12 and which abuts against a shoulder 15 formed in the hollow interior of the piston head 10. The cylinder space 3' above the piston head 10 communicates through a duct 16 or a corresponding bore in housing 2 with the main 5 and thereby also with the pressure storage tank 6.

The control device operates as follows:

When all taps of the water supply system are closed, the piston 10 is in the lowermost position and obstructs the opening 4 as well as the pressure inlet conduit 1. To prevent pressure losses, the piston 10 is seated upon a gasket ring 17. The valve 9, 13 is open, and the pressure responsive switch 7 is subject to the pressure present in the pressure tank 6 and in the water distribution system of which the water main 5 forms part due to the communication of the switch therewith through the pressure pipe 8, the cylinder space 3' and the duct 16. At this predetermined normal pressure of the system the pump motor M is switched off. If any water tap (not shown) is now opened, water will flow out of the pressure storage tank 6. The pressure in the water supply system and consequently in duct 16 and at the valve seat 9 as well as in the switch 7 decreases, and the pressure drop causes the switch 7 to close the electrically energizing circuit for motor M so that the pump commences to deliver water through the pressure conduit 1. The increasing pressure in conduit 1 due to the influx of the well water or the like acts upon the bottom face 18 of piston 10 and displaces it upwardly against the biasing pressure of spring 11 until the lateral opening 4 is uncovered, this condition being illustrated in FIG. 1. Simultaneously, the valve 9, 13 is closed so that the fluid pressure in the pipe 8 is retained at its decreased value while the pressure in pipes 1 and 5 is increasing, and the pressure switch 7 consequently maintains its switched-on position. When the withdrawal of water from the system is reduced so that the flow rate of the water decreases, the back pressure exerted upon the piston face 18 is reduced accordingly. As a result, the piston 10 is displaced by spring 11 in the downward direction. The valve 9, 13 still remains closed because the tappet rod 12 is biased by the spring 14 into the upward nonillustrated position in which the cone valve member 13 engages the valve seat 9. When the previously opened tap is closed, the piston 10 moves further downward until the opening 4 is fully obstructed or covered. The tappet rod 12, the valve cone 13 and the spring 11 are so adapted to one another and to the displacement of piston 10 that, under the condition last mentioned, the valve 9, 13 is then opened. The pressure, which has increased in the pipe system as well as in the pressure storage tank 6, during the closing operation, then acts upon the pressure responsive switch through the open pipe 8 so that the pump motor M is switched off. Since the pressure exerted by the water in the pressure conduit 1 upon the piston 10 then becomes lower than the pressure in the tank 6 and in the pipe line system, the piston 10 is forced downwardly against the gasket 17 and thus covers and closes off the conduit 1. The unit has thereby resumed its original position, and the described performance is repeated when a tap of the system is again opened.

As mentioned hereinabove, the piston 10 is biased by the pressure spring 11 so as to be controlled by the flow rate between the conduits 1 and 5. The pump P consequently continues operating until the flow rate has reached very slight values and a short-cycling operation is prevented. Only when the water withdrawal rate drops below this limit of flow rate, and hence virtually when all taps are closed, is the pump switched off. The minimum limit quantity is so chosen that it is exceeded under all normal operating conditions even if the withdrawal of water is relatively small. On the other hand, the minimum limit is sufficiently large to cause disconnection of the pump motor in the event of a pipe leakage, the dripping of a faucet due to a defective washer, for example, or when a faucet is inadvertently not entirely closed. Only if, for example, a faucet continues dripping for a prolonged period of time can the pressure in the network of water pipes decrease to such an extent as to cause the reenergizing of the pump motor. In such exceptional event however, the continual switching operations would occur after long time intervals.

The pressure inlet conduit 1' of the modified control device illustrated in FIG. 2 is connected to an electrically driven pump as shown in FIG. 1 and furnishes water to the main 5' of the water distribution system. A pressure storage tank (not shown in FIG. 2) is connected to a lateral conduit 19, and the above-described pressure-responsive switch 7 as shown in FIG. 1 is connected to a pressure duct 20. The housing 2' of the device is provided with a valve seat 21 which is located near the entrance opening of the pressure conduit 1' and cooperates with a flow-resistance body 22 which constitutes a substantially parabaloidal or conical valve member biased by a spring 23 into engagement with and protruding downwardly through the valve seat 21. The valve member 22 is coaxially joined with an upwardly extending tappet 24 which has a conical tip at its top end protruding into the entrance opening 25 of the pressure-switch conduit 20, this opening being formed by or provided with a radially elastic sealing ring 25a.

In principle, the device according to FIG. 2 operates in the same manner as the device shown in FIG. 1 and described hereinabove. When the pump motor is switched off, the flow-resistance body 22 is firmly seated in the valve seat 21 and closes off the pressure conduit 1', whereas the valve tip of the tappet 24 is partly withdrawn from the opening 25 so that the pressure-responsive switch 7

(not shown in FIG. 2) is subjected to the pressure of the main 5' and of the pressure storage tank (not shown) connected to conduit 19. When water is withdrawn from the pipe system, the pressure in the system drops and the pressure-responsive switch closes and supplies current to the pump motor. The pump operation now supplies water under pressure to the conduit 1' so that the body 22 is lifted and the tappet 24 simultaneously closes the opening 25. The pump continues operating since the pressure-responsive switch remains subjected to the pressure obtaining above the closed opening 25. When the withdrawal of water from the main 5' is reduced, the spring 23 forces the valve body 22 downwardly and thus also reduces the flow cross section of the annular valve gap 26. When a given limit quantity of water flow is thus reached, the opening 25 is released by the tappet 24 and the pressure switch then opens and terminates the operation of the pump.

To permit adjusting a minimum limit quantity of water flow and the switching-off point accordingly, the flow opening 25 is displaceable in the axial direction. For this purpose, this opening 25 is provided in a threaded nipple 27 which can be adjustably screwed more or less deeply into the housing 2'. The nipple 27 is sealed with respect to the housing 2' by means of a sealing ring 28.

The embodiment shown in FIG. 3 comprises a conduit 29 which connects the pump (not shown) at its down stream end with the pipe system of the water supply system (not shown) at its upstream end. The conduit 29 has a constriction at 30. A diaphragm 31 is clamped in a housing 32 so as to divide it into two chambers of equal volume. Connected to one chamber of the housing by a conduit 33 is the pressure-responsive switch (not shown) for controlling the pump, and a valve seat 34 is provided at the junction of the conduit 33 with the housing portion 38. Located opposite the seat 34 is a valve cone 35 which is connected with the diaphragm 31. The housing portions 38 and 39 are connected by respective ducts or pipes 37 and 36 with the conduit 29 at respective positions located at the constriction 30 and located just ahead of the constriction 30 with respect to the flow direction of the water or downstream thereof.

When the pump motor is switched off, the valve 34, 35 is open. When water is withdrawn from the supply system, the pressure in the system and consequently in the housing portion 38, drops so that a pressure acting upon the pressure-responsive switch also decreases causing the pump to switch into operation. The pump now feeds water through conduit 29. The pressure ahead or downstream of the constriction 30 in conduit 29 is somewhat greater than at the constriction. The same pressure difference exists between the interiors of the respective housing portions 39 and 38 and acts upon the diaphragm 31 which thus deflects upwardly and closes the valve 34, 35. Only when the flow rate is less than a very low minimum value is the pressure difference zero or so small that the diaphragm 31 resumes its normal or median position shown in FIG. 3 and opens the valve 34, 35 causing the pump to stop.

FIG. 4 shows the same control device as in FIG. 2, except that the housing 2" is modified so as to also form a pressure tank 40. This tank communicates through an opening 41 with the main 5" of the water-supplying pipe system and contains an air-inflated elastic ball 42 which suitably expands as the water pressure in the system decreases so as to expel the water from the tank 40 through the opening 41. The control device and the pressure storage tank are thus combined to form a single structural unit.

Figure 5:
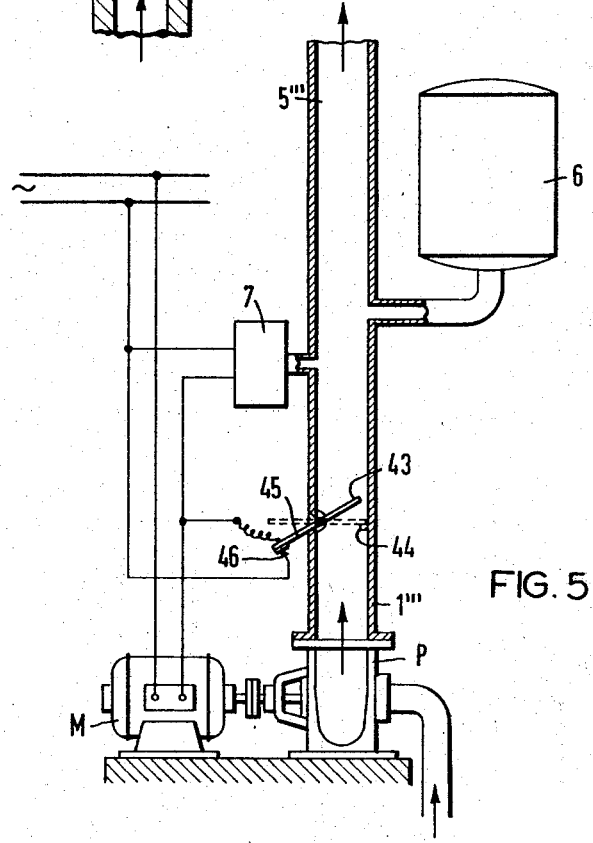
FIG. 5 shows schematically and partly in section still another modification of a water supply unit constructed in accordance with our invention.

In the embodiment shown in FIG. 5, the pump P driven from a motor M supplies water through a pressure conduit 1''' to the main 5''' of the water-distributing pipe system, a pressure tank 6 and a pressure-responsive switch 7 communicating with the main 5'''. Built into the pressure conduit 1''' is a flow-responsive flap member 43 which, when in the closed position shown by the broken lines, rests against a stop 44 secured to the inner surface of the conduit 1'''. The flap 43 is connected with a resilient electric contact 45 cooperating with a stationary contact 46. The switch 45, 46 thus formed is electrically connected in parallel relation to the pressure-responsive switch 7.

The embodiment of the device shown in FIG. 5 operates as follows:

When the water supply system of which the main 5''' is part is closed, then the pressure present in the system as well as in the pressure storage tank 6 is relatively high so that the flap member 43 is closed and the switch 45, 46 is open. The pressure-responsive switch 7 is likewise subjected to the high pressure so that the motor M and the pump P are switched off. When water is being withdrawn from the pipe system, the system pressure decreases and the switch 7 responsive to the decrease in pressure energizes the motor M so that the pump P commences delivering water into the conduit 1'''. Under the resulting water pressure, the flap 43 is opened, closing the switch 45, 46, this condition being shown in FIG. 5. When the withdrawal of water from the supply system is very slight, however, the pressure switch 7 operates to disconnect the motor M. But due to the delivery of water by the pump P the flow-responsive flap 43 is still open; consequently, the switch 45, 46 is still closed so that the motor M remains switched on. Only when the withdrawal of water drops below a certain minimum value so that the pressure can build up in the pipe system and in the pressure tank 6 to the extent required to close the flap 43 in opposition to the pump delivery, can the switch 45, 46 open the circuit and thus disconnect the motor M and stop the pump P.

It will be understood that while, for simplicity, the switches 7 and 45, 46 are shown as directly controlling the motor, conventional relays or contactors are preferably interposed to relieve the control contacts of the otherwise high current loading.

To those skilled in the art it will be obvious upon a study of this disclosure that individual house water-pump control devices and installations according to the invention can be modified in various respects and can be given embodiments other than particularly illustrated and described herein, without departing from the essential features of the invention and within the scope of the claims annexed hereto.

We claim:

1. A pump-motor apparatus for an individual water-supply system, comprising water inlet conduit means for connection to a pump to receive water therefrom, water-supply means connected with said inlet conduit means for supplying water therefrom to outlets of the system, and a control device for starting and stopping a motor for the pump, said control device being interposed between said inlet conduit means and said supply conduit means and including a pressure-responsive switch communicating with said supply conduit means for starting the pump motor in response to a pressure drop in said supply conduit means, said control device having a control member cooperating with said switch for maintaining operation of said pump motor in response to a pressure increase in said inlet conduit means, and for stopping said motor in response to a given subnormal flow rate of water in said supply conduit means, said control member comprising a piston being urged into a blocking position interrupting communication between said inlet conduit means and said supply conduit means in dependence on the flow rate of water in said supply means.

2. Apparatus according to claim 1 wherein said piston is provided with a tappet rod coaxial with and axially displaceable relative to said piston, said tappet rod having a valve member at one end cooperating with a valve seat communicating with said pressure-responsive switch, said tappet rod being spring biased for urging said valve member into closing engagement with said valve seat.

3. A pump-motor apparatus for an individual water-supply system, comprising water inlet conduit means for connection to a pump to receive water therefrom, water-supply means connected with said inlet conduit means for supplying water therefrom to outlets of the system, and a control device for starting and stopping a motor for the pump, said control device being interposed between said inlet conduit means and said supply conduit means and including a pressure-responsive switch communicating with said supply conduit means for starting the pump motor in response to a pressure drop in said supply conduit means, said control device having a control member cooperating with said switch for maintaining operation of said pump motor in response to a pressure increase in said inlet conduit means, and for stopping said motor in response to a given subnormal flow rate of water in said supply conduit means, said control member comprising a substantially conical flow-resistance body member spring-biased in dependence on the flow rate of water in the system to a position within an opening defined by a valve seat located intermediate to said inlet conduit means and said supply conduit means.

4. Apparatus according to claim 3, wherein said flow-resistance body is connected to one end of a rod coaxial therewith, the other end of the rod extending, when water is withdrawn from said outlets, into a radially expansive supply opening communicating with said pressure-responsive switch for closing said opening.

5. Apparatus according to claim 4 wherein the location of said supply opening is adjustable in the axial direction with respect to said flow-resistance body and said rod.

References Cited by the Examiner
UNITED STATES PATENTS

| | | | |
|---|---|---|---|
| 1,247,544 | 11/1917 | Kimes | 103—25 |
| 1,814,454 | 7/1931 | Penn | 103—6 |
| 2,761,389 | 9/1956 | Turner | 103—25 |
| 2,981,195 | 4/1961 | Payne et al. | 103—25 |
| 2,998,256 | 8/1961 | Lipkins | 137—565 X |
| 3,100,505 | 8/1963 | Johnsen | 137—565 |
| 3,106,894 | 10/1963 | Johnsen | 103—25 |
| 3,141,475 | 3/1964 | Guinard et al. | 137—568 |

MARK NEWMAN, *Primary Examiner.*

SAMUEL LEVINE, *Examiner.*

W. L. FREEH, *Assistant Examiner.*